(12) United States Patent
Tabata et al.

(10) Patent No.: US 8,547,058 B2
(45) Date of Patent: Oct. 1, 2013

(54) NON-CONTACT CHARGING MODULE AND RECEPTION-SIDE AND TRANSMISSION-SIDE NON-CONTACT CHARGING APPARATUSES USING THE SAME

(75) Inventors: Kenichiro Tabata, Miyazaki (JP); Tokuji Nishino, Miyazaki (JP); Akio Hidaka, Miyazaki (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/355,865

(22) Filed: Jan. 23, 2012

(65) Prior Publication Data
US 2012/0187904 A1    Jul. 26, 2012

(30) Foreign Application Priority Data

Jan. 26, 2011   (JP) ................. 2011-013617
Jun. 14, 2011   (JP) ................. 2011-131946
Jun. 14, 2011   (JP) ................. 2011-131947
Jun. 14, 2011   (JP) ................. 2011-131948

(51) Int. Cl.
*H02J 7/02* (2006.01)
*H02J 7/00* (2006.01)

(52) U.S. Cl.
USPC ................ 320/108; 320/109; 320/139

(58) Field of Classification Search
USPC ......................................... 320/108
See application file for complete search history.

(56) References Cited

U.S. PATENT DOCUMENTS

| | | | |
|---|---|---|---|
| 6,175,212 B1 * | 1/2001 | Oguri ........................ | 320/108 |
| 6,396,241 B1 * | 5/2002 | Ramos et al. ............... | 320/108 |
| 6,803,744 B1 * | 10/2004 | Sabo ........................... | 320/108 |
| 7,042,196 B2 * | 5/2006 | Ka-Lai et al. ............. | 320/108 |
| 7,271,569 B2 * | 9/2007 | Oglesbee .................... | 320/108 |
| 2002/0093410 A1 | 7/2002 | Nakayama et al. | |
| 2005/0116683 A1 * | 6/2005 | Cheng et al. ............... | 320/108 |
| 2008/0111518 A1 * | 5/2008 | Toya ........................... | 320/108 |
| 2009/0001932 A1 * | 1/2009 | Kamijo et al. ............. | 320/108 |
| 2009/0096413 A1 * | 4/2009 | Partovi et al. .............. | 320/108 |

(Continued)

FOREIGN PATENT DOCUMENTS

| JP | 2002-208527 A | 7/2002 |
|---|---|---|
| JP | 2006-042519 A | 2/2006 |

(Continued)

OTHER PUBLICATIONS

International Search Report dated Apr. 3, 2012 for application PCT/JP2011/007347.

(Continued)

*Primary Examiner* — Yalkew Fantu
(74) *Attorney, Agent, or Firm* — Pearne & Gordon LLP

(57) ABSTRACT

It is an object to provide a non-contact charging module that uses a magnet included in a counterpart-side non-contact charging module or does not use the magnet when aligning with the counterpart-side non-contact charging module is performed. An L value of a coil that is provided in the non-contact charging module is not changed. This non-contact charging module includes a planar coil portion where electrical lines are wound and a magnetic sheet that places a coil surface of the planar coil portion and faces the coil surface of the planar coil portion, and in the magnetic sheet, a hole portion is provided at the position corresponding to a hollow portion of the planar coil portion.

36 Claims, 10 Drawing Sheets

(56) References Cited

U.S. PATENT DOCUMENTS

| | | |
|---|---|---|
| 2010/0007215 A1 | 1/2010 | Sakuma |
| 2010/0181842 A1 | 7/2010 | Suzuki et al. |
| 2010/0244582 A1 | 9/2010 | Yoshikawa |

FOREIGN PATENT DOCUMENTS

| | | | |
|---|---|---|---|
| JP | 2007-317914 A | 12/2007 | |
| JP | 2008-210861 A | 9/2008 | |
| JP | 2008-210862 A | 9/2008 | |
| JP | 2009-159660 A | 7/2009 | |
| JP | 2011-013617 A | 1/2011 | |
| JP | 4835794 B1 | 10/2011 | |
| WO | 2008/156025 A1 | 12/2008 | |
| WO | 2009/105615 A2 | 8/2009 | |

OTHER PUBLICATIONS

Extended European search report for application 11857270.0-1806 dated Apr. 3, 2013.

* cited by examiner

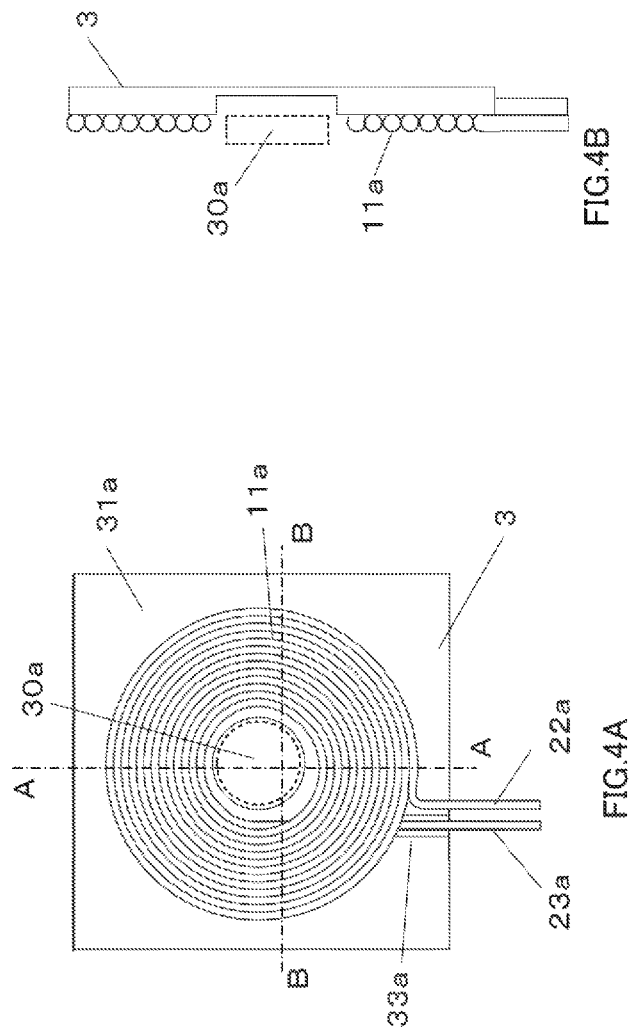
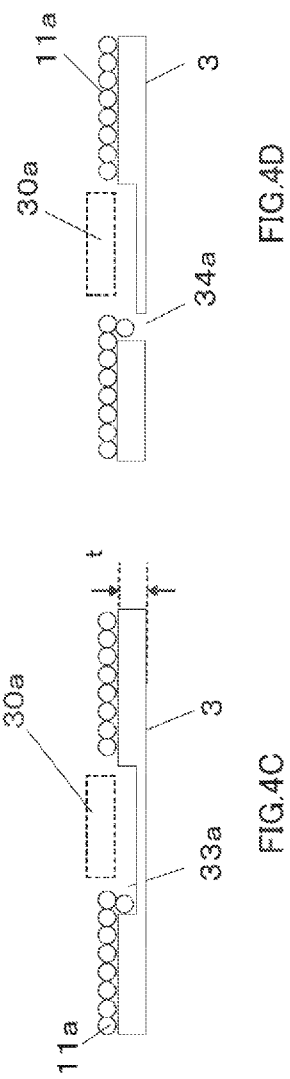
FIG.4A
FIG.4B
FIG.4C
FIG.4D

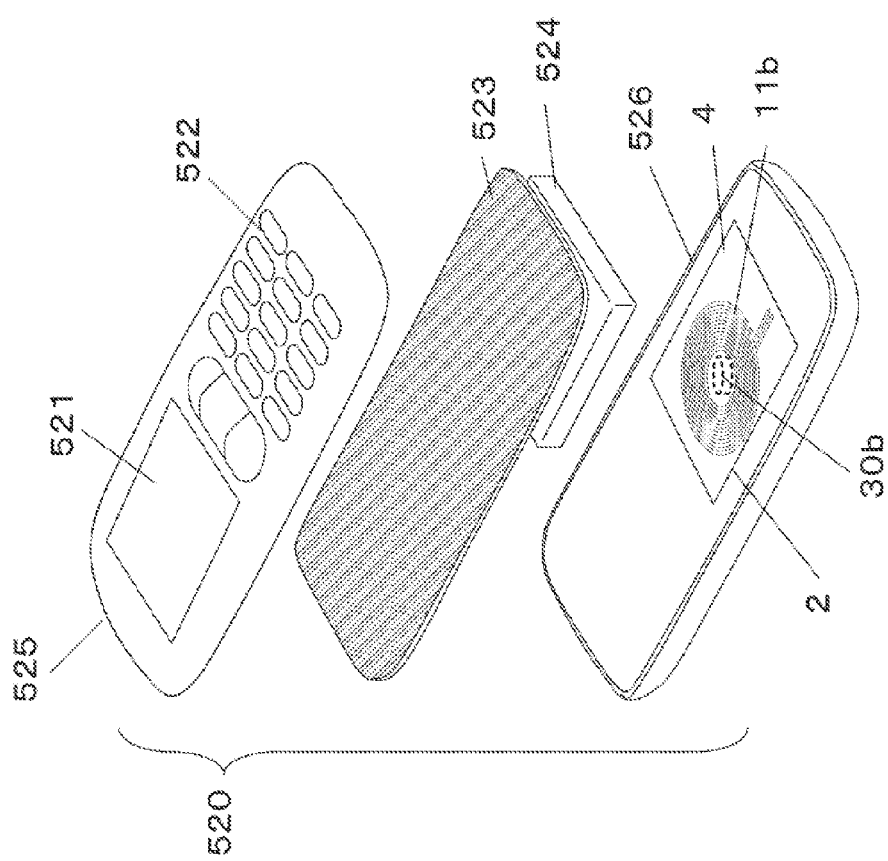

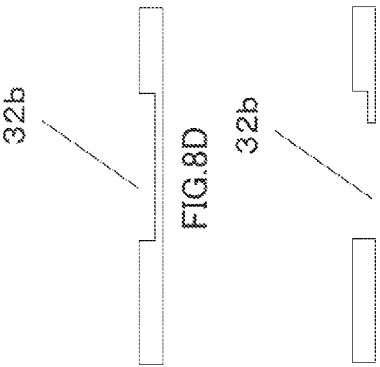
FIG.8C
FIG.8D
FIG.8E
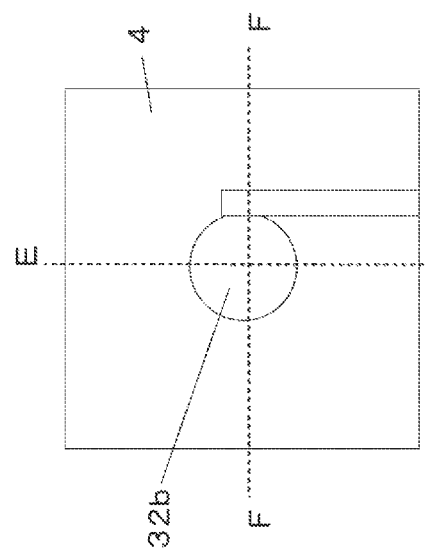
FIG.8A
FIG.8B

NON-CONTACT CHARGING MODULE AND RECEPTION-SIDE AND TRANSMISSION-SIDE NON-CONTACT CHARGING APPARATUSES USING THE SAME

TECHNICAL FIELD

The present invention relates to a non-contact charging module that has a planar coil portion made of spiral electrical lines and a magnetic sheet and a reception-side and transmission-side non-contact charging apparatuses using the same.

BACKGROUND ART

In recent years, apparatuses that charge a body apparatus in a non-contact type using a charger are widely used. In the apparatuses, a transmission-side non-contact charging module is disposed on the side of the charger, a reception-side non-contact charging module is disposed on the side of the body apparatus, and electromagnetic induction is generated between the modules to supply power from the side of the charger to the side of the body apparatus. In addition, it is suggested to apply a portable terminal apparatus as the body apparatus.

It is demanded to decrease the thickness and the size of the body apparatus or the charger of this portable terminal apparatus. In order to meet the demand, it is considered to include a planar coil portion functioning as the transmission-side non-contact charging module or the reception-side non-contact charging module, and a magnetic sheet (refer to Patent Literature 1).

CITATION LIST

Patent Literature

PTL 1
Japanese Patent Application Laid-Open No. 2006-42519

SUMMARY OF INVENTION

Technical Problem

In this type of non-contact charging module, the position of a primary-side non-contact charging module (transmission-side non-contact charging module) and the position of a secondary-side non-contact charging module (reception-side non-contact charging module) need to be accurately aligned. This is to efficiently perform the electromagnetic induction to transmit power.

A method using a magnet is known as one method that accurately aligns the position of the primary-side non-contact charging module (transmission-side non-contact charging module) and the position of the secondary-side non-contact charging module (reception-side non-contact charging module). In this method, the other non-contact charging module is aligned by using the magnetic included in one non-contact charging module. This method is a method in which the magnet is mounted to at least one of the primary-side non-contact charging module and the secondary-side non-contact charging module, the magnets of both sides or one magnet and the other magnetic sheet attract each other, and therefore aligning is performed.

A method that performs aligning without using the magnet is known as another method that accurately aligns the position of the primary-side non-contact charging module and the position of the secondary-side non-contact charging module.

For example, this is a method in which a convex portion is formed in a charging surface of a charger mounted with the primary-side non-contact charging module, a concave portion is formed in an electronic apparatus mounted with the secondary-side non-contact charging module, the convex portion are fitted in the concave portion, and compulsory aligning of the primary-side non-contact charging module and the secondary-side non-contact charging module is physically (geometrically) performed. This is a method in which the primary-side non-contact charging module detects the position of a coil of the secondary-side non-contact charging module in order to automatically move the position of the coil of the primary-side non-contact charging module to the position of a coil of the secondary-side non-contact charging module. This is a method in which a plurality of coils are provided in the charger such that a portable apparatus is chargeable in all places of a charging surface of the charger.

However, in the case where the magnet is used in aligning of the primary-side non-contact charging module and the secondary-side non-contact charging module and the case where the magnet is not used, an L value of the coil that is provided in each non-contact charging module significantly changes. In the electromagnetic induction to supply power, the resonance frequency is determined using the L value of the coil that is provided in each non-contact charging module.

For this reason, in the case where the magnet is used in aligning of the primary-side non-contact charging module and the secondary-side non-contact charging module and the case where the magnets is not used, there is a problem that it is difficult to commonly use the non-contact charging module.

Therefore, in view of the above problems, it is an object of the present invention to provide a non-contact charging module that can suppress a change in an L value of a coil provided in the non-contact charging module in both of the case where a magnet included in the other non-contact charging module is used when a primary-side non-contact charging module and a secondary-side non-contact charging module are aligned and the case where the magnet is not used, and can be used in both of the case where the magnet is used and the case where the magnet is not used. Further, it is an object of the present invention to provide reception-side and transmission-side non-contact charging apparatuses using the same.

Solution to Problem

In order to solve the above problems, the present invention provides a non-contact charging module that has a case where using a magnet included in a counterpart-side non-contact charging module or a case where not using the magnet, when aligning with the counterpart-side non-contact charging module is performed. The non-contact charging module includes a planar coil portion where electrical lines are wound and a magnetic sheet that places a coil surface of the planar coil portion and faces the coil surface of the planar coil portion. In the magnetic sheet, a hole portion is provided at the position corresponding to a hollow portion of the planar coil portion.

Advantageous Effects of Invention

According to the present invention, an L value of a coil that is provided in the non-contact charging module is not changed in both of the case where the magnet included in the other non-contact charging module (the primary-side non-contact charging module or the secondary-side non-contact charging module) is used and the case where the magnet is not used, when the primary-side non-contact charging module and the secondary-side non-contact charging module are aligned, so that it is possible to provide a non-contact charging module that can perform superior aligning and power transmission in both of the case where the magnet is used and the case where the magnet is not used.

BRIEF DESCRIPTION OF DRAWINGS

FIG. 4 is a detailed diagram illustrating the primary-side non-contact charging module according to the embodiment of the present invention;

FIG. 5 is a diagram illustrating the configuration of a portable terminal apparatus according to the embodiment of the present invention;

FIG. 8 is a conceptual diagram of a magnetic sheet of a non-contact charging module according to the embodiment of the present invention;

DESCRIPTION OF EMBODIMENTS

Figure 1:
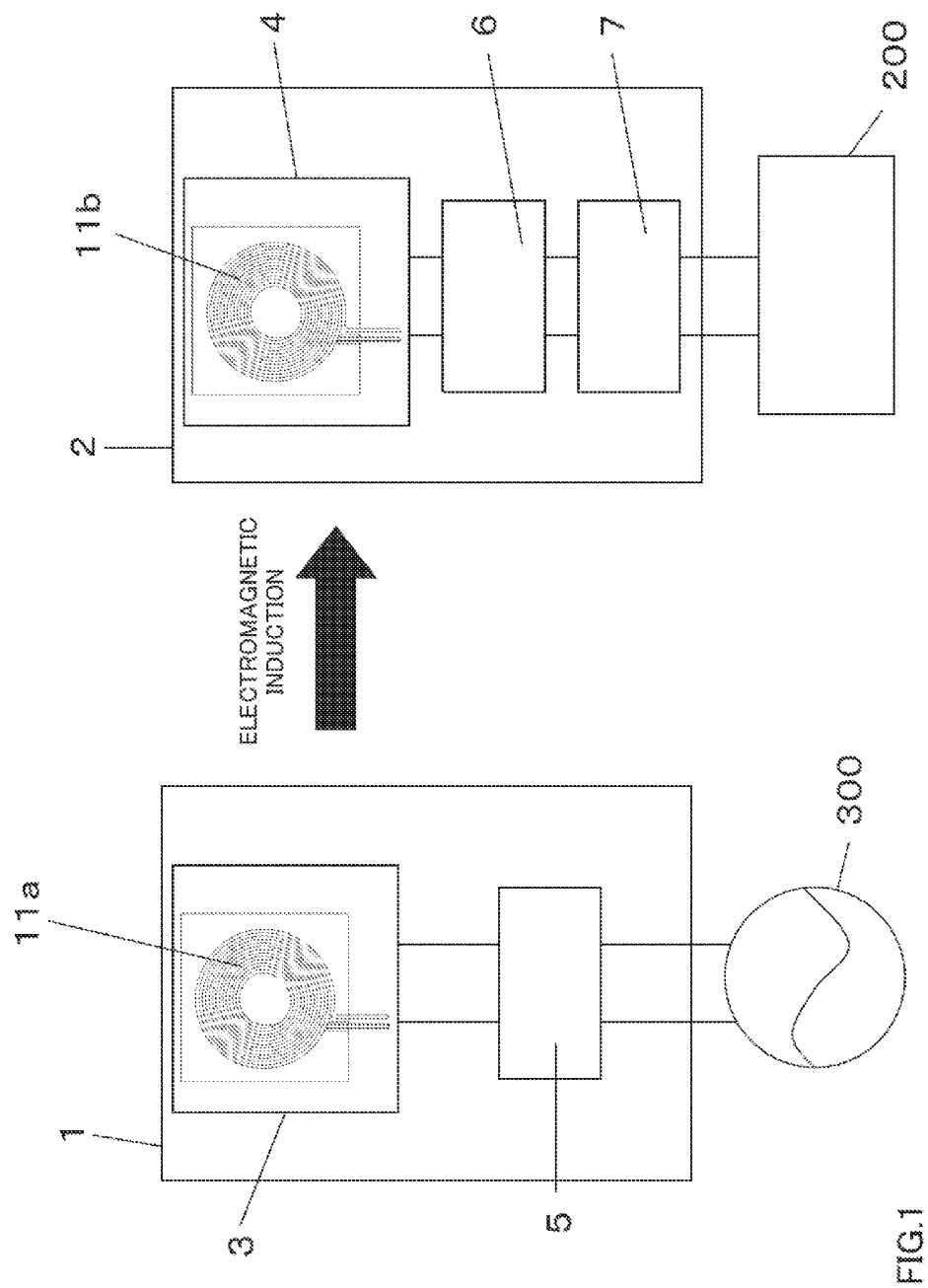
FIG. 1 is a block diagram illustrating a non-contact power transmitting apparatus according to an embodiment of the present invention.

In the invention according to Claim 1, a non-contact charging module that uses a magnet included in a counterpart-side non-contact charging module or does not use the magnet when aligning with the counterpart-side non-contact charging module is performed is provided. The non-contact charging module includes a planar coil portion where electrical lines are wound and a magnetic sheet that places a coil surface of the planar coil portion and faces the coil surface of the planar coil portion. In the magnetic sheet, a hole portion is provided at the position corresponding to a hollow portion of the planar coil portion. Thereby, an L value of a coil that is provided in the non-contact charging module is not changed in both of the case where the magnet included in the counterpart-side non-contact charging module is used and the case where the magnet is not used, when the primary-side non-contact charging module and the secondary-side non-contact charging module are aligned. Therefore, a non-contact charging module that can be efficiently used in both of the case where the magnet is used and the case where the magnet is not used can be obtained.

In the invention according to Claim 2, the hole portion is a through-hole. Thereby, an influence of the magnet that is used in aligning can be suppressed to a minimum.

In the invention according to Claim 3, the depth of the hole portion is 40 to 60% of the thickness of the magnetic sheet. Thereby, the L values of the coil in the case where the magnet is used in aligning and the case where the magnet is not used in aligning can be set to be similar to each other and an aligning effect of the magnet can be sufficiently obtained.

In the invention according to Claim 4, the electrical lines of the planar coil portion are wound in a circular shape. Thereby, the magnetic flux can be equally generated and power transmission can be stably performed.

In the invention according to Claim 5, a shape of a top surface of the hole portion is the same as a shape of the hollow portion of the planar coil portion. Thereby, the magnet and the center portion of the magnetic sheet attract with a good balance and the centers thereof can be precisely aligned.

In the invention according to Claim 6, all of ends of the hole portion have the same distance from ends of the hollow portion of the planar coil portion. Thereby, the magnet and the center portion of the magnetic sheet attract with a good balance and the centers thereof can be precisely aligned.

In the invention according to Claim 7, the hole portion is formed to be bigger than the magnet. Thereby, an influence of the magnet can be suppressed with a good balance.

In the invention according to Claim 8, the center of the hole portion is matched with the center of a center portion of the planar coil portion. Thereby, the magnet and the center portion of the magnetic sheet attract with a good balance and the centers thereof can be precisely aligned.

In the invention according to Claim 9, the electrical lines of the planar coil portion are wound in a rectangular shape. Thereby, power transmission can be efficiently performed.

Embodiment

Now, an embodiment of the present invention will be described in detail with reference to the accompanying drawings.

FIG. 1 is a block diagram illustrating a non-contact power transmitting apparatus according to an embodiment of the present invention.

The non-contact power transmitting apparatus includes primary-side non-contact charging module 1 (transmission-side non-contact charging module) and secondary-side non-contact charging module 2 (reception-side non-contact charging module) and transmits power from primary-side non-contact charging module 1 to secondary-side non-contact charging module 2 using an electromagnetic induction action. The non-contact power transmitting apparatus is used in transmitting power of about 5 W or less. The frequency of power transmission is about 110 to 205 kHz.

Primary-side non-contact charging module 1 is mounted to a charger and secondary-side non-contact charging module 2 is mounted to, for example, a mobile phone, a digital camera, and a PC. Primary-side non-contact charging module 1 includes primary-side coil 11a, magnetic sheet 3, resonance capacitor (not illustrated), and power input section 5. Power input section 5 is connected to commercial power supply 300 functioning as an external power supply, receives power of about 100 to 240 V, converts the power into a predetermined current (direct current 12 V, 1 A), and supplies the predetermined current to primary-side coil 11a. Primary-side coil 11a generates a magnetic field according to the shape thereof, the winding number thereof, and the supplied current. The resonance capacitor is connected to primary-side coil 11a and determines the resonance frequency of the magnetic field generated from primary-side coil 11a according to a relation with primary-side coil 11a. The electromagnetic induction action from primary-side non-contact charging module 1 to secondary-side non-contact charging module 2 is performed by the resonance frequency.

Meanwhile, secondary-side non-contact charging module 2 includes secondary-side coil 11b, magnetic sheet 4, resonance capacitor (not illustrated), rectifying circuit 6, and power output section 7. Secondary-side coil 11b receives the magnetic field generated from primary-side coil 11a, converts the magnetic field into a predetermined current by the electromagnetic induction action, and outputs the predetermined current to the outside of secondary-side non-contact charging module 2 through rectifying circuit 6 and power output section 7. Rectifying circuit 6 rectifies the predetermined current which is an alternating current and converts the predetermined current into a predetermined current which is a direct current (direct current 5 V, 1.5 A). Power output section 7 is an external output section of secondary-side non-contact charging module 2 and supplies power to electronic apparatus 200 connected to secondary-side non-contact charging module 2 through power output section 7.

Next, the case where primary-side non-contact charging module 1 is mounted to a non-contact charger will be described.

Figure 2:
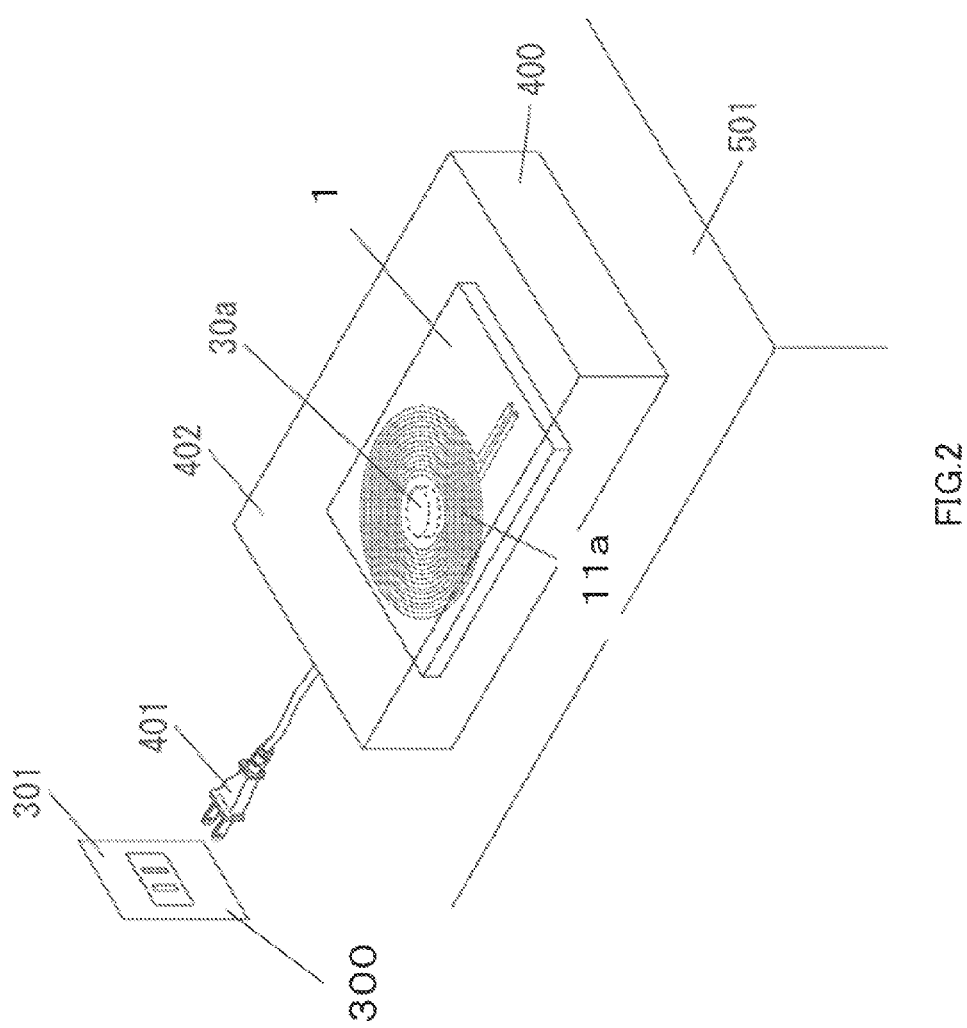
FIG. 2 is a diagram illustrating the configuration of a non-contact charger according to the embodiment of the present invention.

FIG. 2 is a diagram illustrating the configuration of a non-contact charger according to the embodiment of the present invention. An inner portion of the non-contact charger illustrated in FIG. 2 can be viewed.

Non-contact charger 400 that transmits power using the electromagnetic induction action has primary-side non-contact charging module 1 in a case constituting an exterior package.

Non-contact charger 400 has plug 401 that is plugged into outlet 301 of commercial power supply 300 disposed indoors or outdoors. By plugging plug 401 into outlet 301, non-contact charger 400 can receive power from commercial power supply 300.

Non-contact charger 400 is disposed on desk 501 and primary-side non-contact charging module 1 is disposed in the vicinity of surface 402 of the side opposite to the side of a desk surface of non-contact charger 400. A principal surface of primary-side coil 11a in primary-side non-contact charging module 1 is disposed in parallel to surface 402 of the side opposite to the side of the desk surface of non-contact charger 400. In this way, a power reception work area of the electronic apparatus mounted with secondary-side non-contact charging module 2 can be secured. Non-contact charger 400 may be disposed on a wall surface. In this case, non-contact charger 400 is disposed in the vicinity of a surface of the side opposite to the side of the wall surface.

Primary-side non-contact charging module 1 may have magnet 30a that is used in aligning with secondary-side non-contact charging module 2. In this case, magnet 30a is disposed in a hollow portion that is positioned at a center area of primary-side coil 11a.

Next, primary-side non-contact charging module 1 will be described.

Figure 3:
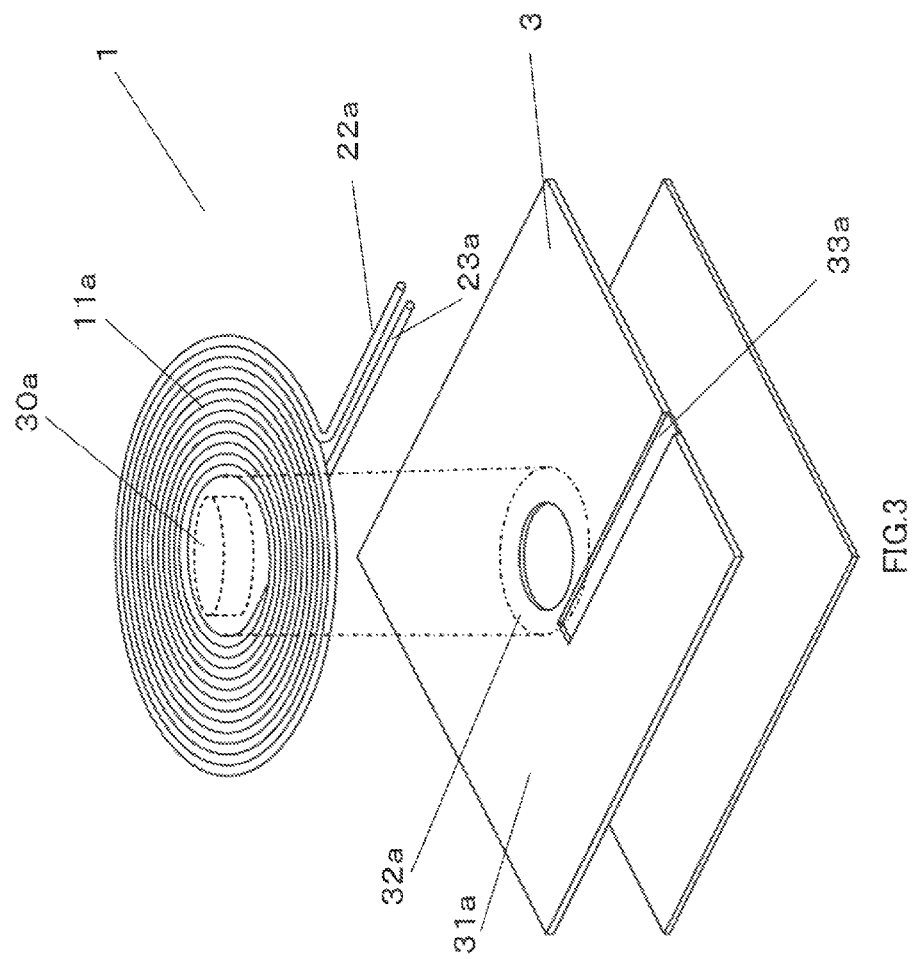
FIG. 3 is a diagram illustrating a primary-side non-contact charging module according to the embodiment of the present invention.

FIG. 3 is a diagram illustrating the primary-side non-contact charging module according to the embodiment of the present invention and illustrating the case where the primary-side coil is circular. Though FIG. 3 illustrates the primary-side coil that is a circular coil that is wound in a circular shape, the primary-side coil may be a rectangular coil that is wound in a substantially rectangular shape. The specific configuration of the primary-side non-contact charging module described hereinafter is basically applied to the secondary-side non-contact charging module. The difference of the primary-side non-contact charging module, and the secondary-side non-contact charging module will be described in detail below.

Primary-side non-contact charging module 1 includes primary-side coil 11a where electrical lines are wound in a spiral shape and magnetic sheet 3 that is provided to face a surface of primary-side coil 11a.

As illustrated in FIG. 3, primary-side coil 11a includes a coil that is wound around a conductor in a radial direction to draw a whirlpool on the surface and terminals 22a and 23a that function as current supplying sections provided on both ends of the coil. That is, terminals 22a and 23a that function as the current supplying sections supplies the current from commercial power supply 300 which is the external power supply to primary-side coil 11a. The coil is obtained by winding electrical lines in parallel on the plane and a surface that is formed by the coil is called a coil surface. The thickness direction is a stack direction of primary-side coil 11a and magnetic sheet 3.

Magnetic sheet 3 includes flat portion 31a that places primary-side coil 11a, center portion 32a that is a center portion of flat portion 31a and corresponds to a hollow area of primary-side coil 11a, and linear concave portion 33a that inserts a part of a leading line of primary-side coil 11a. In center portion 32a, a concave portion or a through-hole is formed with respect to flat portion 31a.

In primary-side non-contact charging module 1 according to the present embodiment, primary-side coil 11a is wound from an inner diameter where a diameter is 20 mm to the outside and an outer diameter of the primary-side coil becomes 30 mm. That is, primary-side coil 11a is wound in a doughnut shape. Primary-side coil 11a may be wound in a circular shape and may be wound in a polygonal shape.

By wounding the electrical lines to leave a space, the floating capacity between the electrical line of an upper stage and the electrical line of a lower stage decreases and alternating-current resistance of primary-side coil 11a can be suppressed to a minimum. In addition, the thickness of primary-side coil 11a can be suppressed by wounding the electrical lines densely.

Primary-side non-contact charging module 1 may have magnet 30a that is used in aligning with secondary-side non-contact charging module 2. In this case, a shape of magnet 30a is defined to a circular shape and a diameter thereof is defined to 15.5 mm or less by the standard (WPC). Magnet 30a has a coin shape and needs to be disposed such that a center thereof is matched with a winding center axis of primary-side coil 11a. This is to decrease an influence of magnet 30a with respect to primary-side coil 11a.

That is, as an aligning method, the following methods are used. For example, a method in which a convex portion is formed in a charging surface of a charger, a concave portion is formed in an electronic apparatus of the secondary side, the convex portion is fitted into the concave portion, and compulsory aligning is physically (geometrically) performed is used. A method in which a magnet is mounted to at least one of the primary side and the secondary side, the magnets of both sides or one magnet and the other magnetic sheet attract each other, and aligning is performed is used. A method in which the primary side detects the position of a coil of the secondary side to automatically move a coil of the primary side to the position of the coil of the secondary side is used. A method in which a plurality of coils are provided in a charger such that a portable apparatus is chargeable in all places of a charging surface of the charger is used.

As such, the various methods that are used in aligning the coils of the primary-side (charging-side) non-contact charging module and the secondary-side (charged-side) non-contact charging module are described. However, the methods are divided into methods performed with the magnet and methods performed without the magnet. In addition, according to the primary-side (charging-side) non-contact charging module, the primary-side non-contact charging module is configured to be adapted to both of the secondary-side (charged-side) non-contact charging module with the magnet and the secondary-side (charged-side) non-contact charging module without the magnet, and charging can be performed, regardless of a type of the secondary-side (charged-side) non-contact charging module. Therefore, convenience is improved. Likewise, according to the secondary-side (charged-side) non-contact charging module, the secondary-side non-contact charging module is configured to be adapted to both of the primary-side (charging-side) non-contact charging module with the magnet and using the magnet in aligning and the primary-side (charging-side) non-contact charging module without the magnet and not using the magnet in aligning, and charging can be performed, regardless of a type of the primary-side (charging-side) non-contact charging module. Therefore, convenience is improved. That is, in the non-contact charging module that performs power transmission by the electromagnetic induction action with the other non-contact charging module which is a counterpart performing the power transmission and performs aligning using the magnet included in the other non-contact charging module or performs aligning without using the magnet when aligning with the other non-contact charging module is performed, the non-contact charging module needs to be configured to surely perform the power transmission.

As a first method that disposes magnet 30a in the case where primary-side non-contact charging module 1 has magnet 30a, a method that disposes magnet 30a on a top surface of center portion 32a of magnetic sheet 3 is known. As a second method that disposes magnet 30a, a method that disposes magnet 30a at the position instead of center portion 32a of magnetic sheet 3 is known. In the second method, since magnet 30a is disposed in the hollow area of the coil, a size of primary-side non-contact charging module 1 can be decreased.

When the magnet is not used in aligning of primary-side non-contact charging module 1 and secondary-side non-contact charging module 2, the magnet 30a illustrated in FIG. 3 is not needed.

In this case, an influence of the magnet with respect to power transmission efficiency of the non-contact charging module will be described. In general, the magnet is provided in the hollow portion of the coil incorporated in at least one of the primary-side non-contact charging module and the secondary-side non-contact charging module. Thereby, the magnet and the magnet or the magnet and the magnetic sheet 3 can be placed closely each other as close as possible, and, at the same time, the primary-side coil and the secondary-side coil can be placed closely each other. The magnet is circular. In this case, the diameter of the magnet becomes smaller than the inner width of the coil. In the present embodiment, the diameter of the magnet is about 15.5 mm (about 10 to 20 mm) and the thickness thereof is about 1.5 to 2 mm. A neodymium magnet may be used and the strength thereof may be about 75 to 150 mT. In the present embodiment, since an interval of the coil of the primary-side non-contact charging module and the coil of the secondary-side non-contact charging module is about 2 to 5 mm, sufficient aligning can be performed by the corresponding magnet.

When the magnetic flux is generated between the primary-side coil and the secondary-side coil to transmit power, if the magnet exists between the primary-side coil and the secondary-side coil and around the primary-side coil and the secondary-side coil, the magnetic flux extends to avoid the magnet. The magnetic flux that passes through the magnet becomes an eddy current or generates heat in the magnet and is lost. If the magnet is disposed in the vicinity of the magnetic sheet, the permeability of the magnetic sheet in the vicinity of the magnet may be decreased. Therefore, magnet 30a that is included in primary-side non-contact charging module 1 may decrease the L values of both primary-side coil 11a and secondary-side coil 11b. As a result, transmission efficiency between the non-contact charging modules may be decreased.

FIG. 4 is a detailed diagram illustrating the primary-side non-contact charging module according to the embodiment of the present invention. FIG. 4(a) is a top view of the primary-side non-contact charging module and FIG. 4(b) is a cross-sectional view taken along the line A-A of the primary-side non-contact charging module in FIG. 4(a). FIG. 4(c) is a cross-sectional view taken along the line B-B of the primary-side non-contact charging module in FIG. 4(a) in the case where a linear concave portion is provided. FIG. 4(d) is a cross-sectional view taken along the line B-B of the primary-side non-contact charging module in FIG. 4(a) in the case where a slit is provided. FIGS. 4(a) and 4(b) illustrate the case where magnet 30a is not included. When the magnet is included, magnet 30a illustrated by a dotted line is included.

Primary-side coil 11a achieves decreasing the thickness of non-contact charger 400 mounted with primary-side non-contact charging module 1. For this reason, an area from a winding starting portion positioned in a center area of primary-side coil 11a to terminal 23a is configured as two stages in the thickness direction and the remaining area is configured as one stage. At this time, the electrical line of the upper stage and the electrical line of the lower stage are wound to leave a space, the floating capacity between the electrical line of the upper stage and the electrical line of the lower stage decreases, and the alternating-current resistance of primary-side coil 11a can be suppressed to a minimum.

When the electrical lines are stacked and primary-side coil 11a is extended in the thickness direction of primary-side non-contact charging module 1, the amount of current that flows to primary-side coil 11a can be increased by increasing the winding number of primary-side coil 11a. When the electrical lines are stacked, if the electrical line of the upper stage and the electrical line of the lower stage are wound densely, the thickness of primary-side coil 11a is suppressed, and the amount of current flowing to primary-side coil 11a can be increased.

In the present embodiment, primary-side coil 11a is formed using the electrical lines having a circular cross-sectional shape. However, the electrical lines that have a rectangular cross-sectional shape may be used. When the electrical lines having the circular cross-sectional shape are used, gaps are generated between the electrical lines adjacent to each other. For this reason, the floating capacity between the electrical lines decreases and the alternating-current resistance of primary-side coil 11a can be suppressed to a minimum.

It is preferable to wind primary-side coil 11a in one stage in the thickness direction, instead of winding primary-side coil 11a in two stages in the thickness direction, because the alternating-current resistance of primary-side coil 11a decreases and transmission efficiency can be increased. This is because the floating capacity is generated between the electrical line of the upper stage and the electrical line of the lower stage, if the electrical lines are wound in the two stages. Therefore, it is preferable to wind most of the parts of primary-side coil 11a in one stage, instead of winding all of the parts of primary-side coil 11a in two stages. By winding primary-side coil 11a in one stage, primary-side non-contact charging module 1 can be formed to have the small thickness. When a planar coil portion is configured by the two electrical lines, the two electrical lines are electrically connected by solder in portions of terminals 22a and 23a. For this reason, the two electrical lines may be configured as one thick electrical line. The two electrical lines may be wound in parallel to the coil surface and may be wound vertically to the coil surface. That is, when the two electrical lines are parallel to the coil surface, the two electrical lines are wound around the same center in a planar shape and one electrical line is inserted into the other electrical line in the radial direction. As such, the two electrical lines are bonded in the portions of terminals 22a and 23a to function as one electrical line, and the thickness can be suppressed even though the electrical lines have the same cross-sectional area. That is, the cross-sectional area of the electrical line where the diameter is 0.25 mm can be obtained by preparing two electrical lines where the diameter is 0.18 mm. Therefore, if one electrical line where the diameter is 0.25 mm is prepared, the thickness of one turn of the coil is 0.25 mm and the width of the coil in the radial direction is 0.25 mm. However, if two electrical lines where the diameter is 0.18 mm are prepared, the thickness of one turn of the coil is 0.18 mm and the width of the coil in the radial direction is 0.36 mm. The thickness direction is a stack direction of the planar coil portion and magnetic sheet 3. Only parts of the center side of the coil may overlap in two stages in the thickness direction and the remaining part of the outside may be configured as one stage. In the case where the electrical lines are wound vertically to the coil surface, the thickness of primary-side non-contact charging module 1 increases. However, the cross-sectional area of the electrical line increase substantially, the amount of current that flows to the planar coil portion can be increased, and the sufficient winding number can be easily secured. In the present embodiment, primary-side coil 11a is configured by the electrical lines having the diameter of about 0.18 to 0.35 mm. In primary-side coil 11a of primary-side non-contact charging module 1, the electrical lines having the diameter of 0.25 to 0.35 mm are preferable.

The loss in primary-side coil 11a can be prevented by decreasing the alternating-current resistance of primary-side coil 11a and power transmission efficiency of primary-side non-contact charging module 1 that depends on the L value can be improved by improving the L value.

In the present embodiment, primary-side coil 11a is formed in an annular shape (circular shape). A shape of primary-side coil 11a is not limited to the annular shape (circular shape) and may be an elliptical shape, a rectangular shape, and a polygonal shape. If aligning of primary-side non-contact charging module 1 and secondary-side non-contact charging module 2 is considered, the shape of primary-side coil 11a is preferably the annular shape (circular shape). This reason is as follows. When the shape of primary-side coil 11a is the annular shape (circular shape), because transmission/reception of power can be performed over a wider range, aligning of primary-side coil 11a of primary-side non-contact charging module 1 and secondary-side coil 11b of secondary-side non-contact charging module 2 can be easily performed. That is, since transmission/reception of the power can be performed over a wider range, it is difficult that secondary-side non-contact charging module 2 receives an influence of an angle with respect to primary-side non-contact charging module 1.

Terminals 22a and 23a may be placed closely each other and may be apart from each other. However, when terminals 22a and 23a are apart from each other, primary-side non-contact charging module 1 may be easily mounted.

Magnetic sheet 3 is provided to improve power transmission efficiency of non-contact charging using the electromagnetic induction action, and includes flat portion 31a, center portion 32a that is a center and corresponds to an inner diameter of primary-side coil 11a, and linear concave portion 33a. When magnet 30a is provided to perform aligning of primary-side non-contact charging module 1 and secondary-side non-contact charging module 2, magnet 30a may be disposed on center portion 32a and may be disposed at the position instead of center portion 32a. A concave portion or a through-hole may be provided in a portion that corresponds to the hollow portion of coil 11a of magnetic sheet 3. In addition, the linear concave portion 33a can be replaced slit 34a in FIG. 4(d).

As magnetic sheet 3, a ferrite sheet of the Ni—Zn system, a ferrite sheet of the Mn—Zn system, and a ferrite sheet of the Mg—Zn system and the like may be used. Magnetic sheet 3 may be configured as a single layer, may be configured by stacking a plurality of sheets made of the same material in the thickness direction, and may be configured by stacking a plurality of different magnetic sheets in the thickness direction. Magnetic sheet 3 is preferably configured such that the permeability is 250 or more and the saturation magnetic flux density is 350 mT or more.

An amorphous metal may be used as magnetic sheet 3. When the ferrite sheet is used as magnetic sheet 3, the alternating-current resistance of primary-side coil 11a can be decreased, and when the amorphous metal is used as magnetic sheet, the thickness of primary-side coil 11a can be decreased. The shape of magnetic sheet 3 may be a circular shape, a rectangular shape, a polygonal shape, and a rectangular shape and a polygonal shape having large curved lines at four corners.

Next, an influence of the magnet with respect to primary-side non-contact charging module 1 and secondary-side non-contact charging module 2 (described later) below will be described. The magnetic field that is generated by primary-side non-contact charging module 1 is received by secondary-side coil 11b in secondary-side non-contact charging module 2 to transmit power. In this case, if the magnet is disposed around primary-side coil 11a and secondary-side coil 11b, the magnetic field may be generated to avoid the magnet or the magnetic field that passes through the magnet may be removed. The permeability of a part of magnetic sheet 3 that is close to the magnet may decrease. That is, the magnetic field is weakened by the magnet. Therefore, in order to minimize the magnetic field weakened by the magnet, a countermeasure is necessary for primary-side coil 11a and secondary-side coil 11b to be apart from the magnet or magnetic sheet 3 that is difficult to be affected by the magnet.

Next, the case where secondary-side non-contact charging module 2 is mounted to a portable terminal apparatus will be described.

FIG. 5 is a diagram illustrating the configuration of a portable terminal apparatus according to the embodiment of the present invention and is a perspective view illustrating the exploded portable terminal apparatus.

Portable terminal apparatus 520 includes liquid crystal panel 521, operation button 522, substrate 523, battery pack 524 and the like. Portable terminal apparatus 520 that receives power using the electromagnetic induction action is a portable terminal apparatus that includes secondary-side non-contact Charging module 2 in casing 525 and casing 526 forming an exterior package thereof.

On a back surface of casing 525 where liquid crystal panel 521 and operation button 522 are provided, substrate 523 including a control section that receives information input from operation button 522, displays needed information on liquid crystal panel 521, and controls entire portable terminal apparatus 520 is provided. In addition, on the back surface of substrate 523, battery pack 524 is provided. Battery pack 524 is connected to substrate 523 and supplies power to substrate 523.

On the back surface of battery pack 524, that is, on the side of casing 526, secondary-side non-contact charging module 2 is provided. Secondary-side non-contact charging module 2 receives power from primary-side non-contact charging module 1 by the electromagnetic induction action and charges battery pack 524 using the power.

Secondary-side non-contact charging module 2 includes secondary-side coil 11*b*, magnetic sheet 4 and the like. When a power supply direction is set to the side of casing 526, if secondary-side coil 11*b* and magnetic sheet 4 are disposed sequentially from the side of casing 526 between casing 526 and substrate 523, an influence of substrate 523 and battery pack 524 can be alleviated and power can be received. Although FIG. 5 illustrates a state in which magnetic sheet 4 is disposed closer to the side of casing 526 than secondary-side coil 11*b*, FIG. 5 schematically illustrates the configuration for easy understanding. In practice, as described above, secondary-side coil 11*b* and magnetic sheet 4 are disposed sequentially from the side of casing 526.

Next, secondary-side non-contact charging module 2 will be described.

Figure 6:
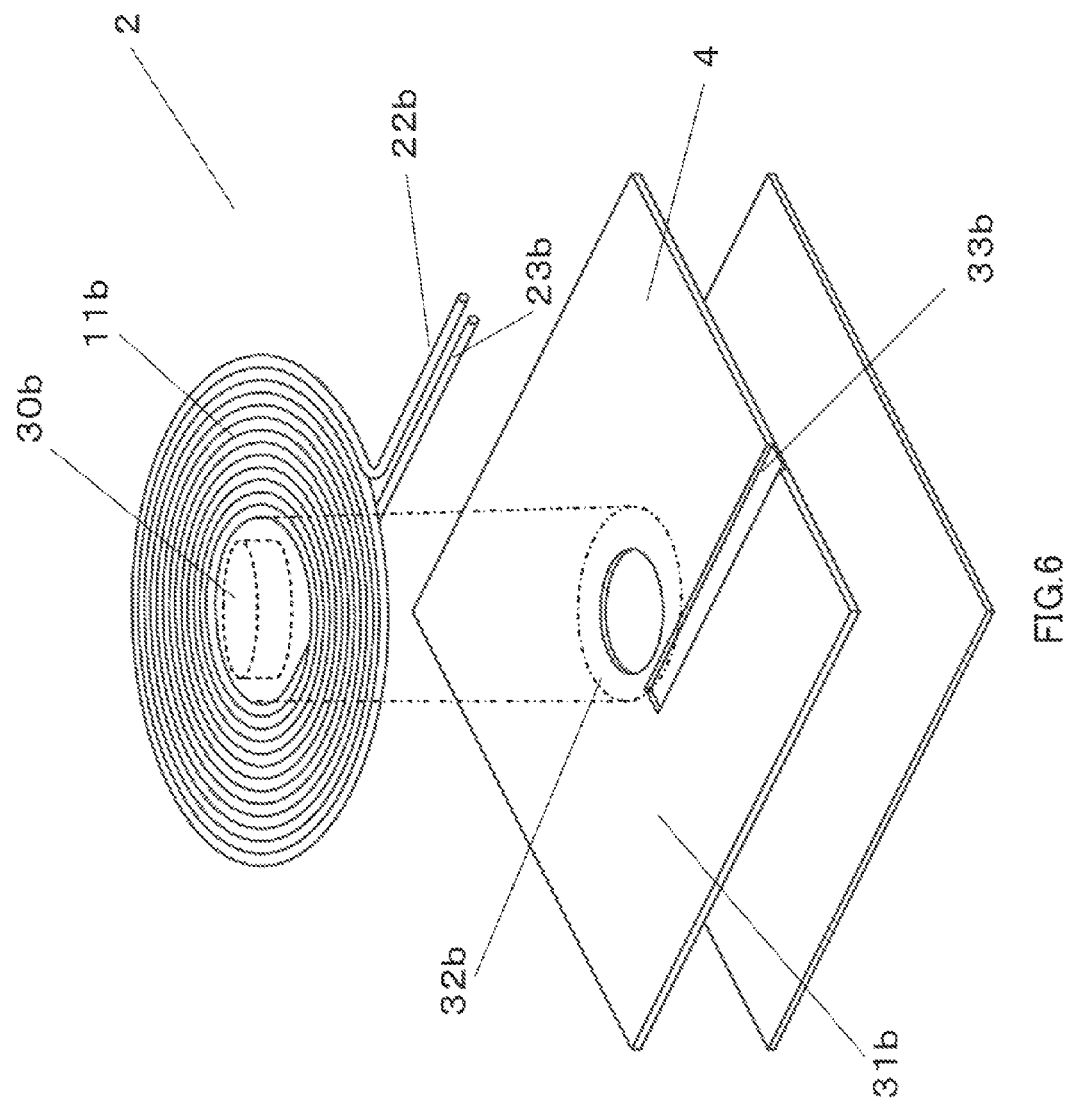
FIG. 6 is a diagram illustrating a secondary-side non-contact charging module according to the embodiment of the present invention.
Figure 7B:
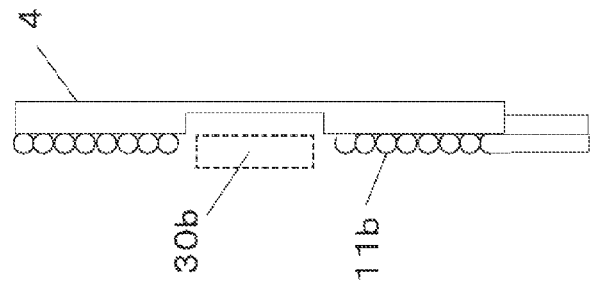
FIG. 7 is a detailed diagram illustrating the secondary-side non-contact charging module according to the embodiment of the present invention.
Figure 7D:
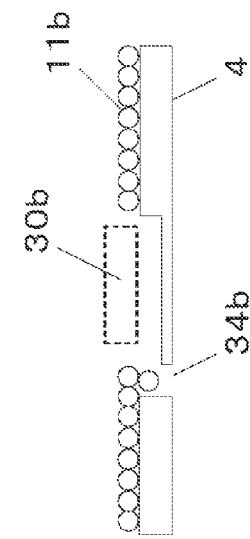
Figure 7A:
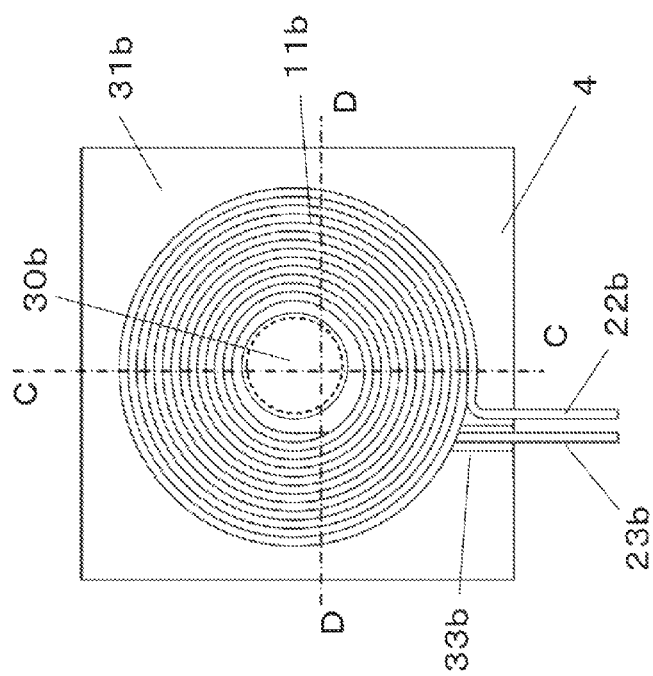
Figure 7C:
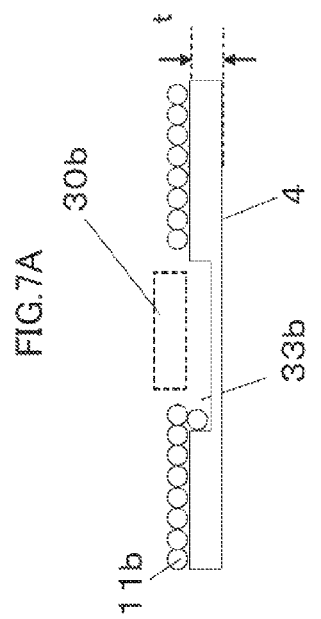

FIG. 6 is a diagram illustrating the secondary-side non-contact charging module according to the embodiment of the present invention and illustrating the case where the secondary-side coil is a circular coil.

FIG. 7 is a detailed diagram illustrating the secondary-side non-contact charging module according to the embodiment of the present invention. FIG. 7(*a*) is a top view of the secondary-side non-contact charging module and FIG. 7(*b*) is a cross-sectional view taken along the line C-C of the secondary-side non-contact charging module in FIG. 7(*a*). FIG. 7(*c*) is a cross-sectional view taken along the line D-D of the secondary-side non-contact charging module in FIG. 7(*a*) in the case where a linear concave portion is provided. FIG. 7(*d*) is a cross-sectional view taken along the line D-D of the secondary-side non-contact charging module in FIG. 7(*a*) in the case where a slit is provided. FIGS. 7(*a*) and 7(*b*) illustrate the case where magnet 30*b* is not included. In the case where the magnet is included, magnet 30*b* that is illustrated by a dotted line is included.

FIGS. 6 and 7 that illustrate secondary-side non-contact charging module 2 correspond to FIGS. 3 and 4 that illustrate primary-side non-contact charging module 1. The configuration of secondary-side non-contact charging module 2 is substantially the same as the configuration of primary-side non-contact charging module 1.

Secondary-side non-contact charging module 2 is different from primary-side non-contact charging module 1 in the size and the material of magnetic sheet 4. Magnetic sheet 4 that is used in secondary-side non-contact charging module 2 has the size that is smaller than about 40×40 mm and the thickness that is about 2 mm or less.

The size of magnetic sheet 3 that is used in primary-side non-contact charging module 1 is different from the size of magnetic sheet 4 that is used in secondary-side non-contact charging module 2. This is because secondary-side non-contact charging module 2 is generally mounted to a portable electronic apparatus and a small size is required. In the present embodiment, magnetic sheet 4 is substantially square and has the size of about 33×33 mm. It is demanded to form magnetic sheet 4 with the size equal to or larger than the size of an outer circumferential end of secondary-side coil 11*b*. The shape of magnetic sheet 4 may be a circular shape, a rectangular shape, a polygonal shape, and a rectangular shape and a polygonal shape having large curved lines at four corners.

Since secondary-side non-contact charging module 2 is used in a portable terminal as the reception side of power supply, an occupation space of secondary-side non-contact charging module 2 in the portable terminal has no room. Since the amount of current flowing to secondary-side coil 11*b* of secondary-side non-contact charging module 2 is small, an insulating property of magnetic sheet 4 is not so required. In the present embodiment, secondary-side coil 11*b* is configured using the electrical lines having the diameter of about 0.18 to 0.35 mm and the electrical lines having the diameter of about 0.18 to 0.30 mm are preferable in secondary-side coil 11*b* of secondary-side non-contact charging module 2.

When the mounted electronic apparatus is a mobile phone, the secondary-side non-contact charging module is generally disposed between the case constituting the exterior package of the mobile phone and the battery packet positioned in the mobile phone. In general, since the battery pack is a casing made of aluminum, the battery pack adversely affects power transmission. This is because the eddy current is generated in the aluminum in a direction weakening the magnetic flux generated by the coil and the magnetic flux of the coil is weakened. For this reason, an influence with respect to the aluminum needs to be alleviated by providing magnetic sheet 4 between the aluminum which is the exterior package of the battery pack and secondary-side coil 11*b* disposed on the exterior package thereof.

Next, the thickness of the center portions of magnetic sheets 3 and 4 will be described.

FIG. 8 is a conceptual diagram of a magnetic sheet of a non-contact charging module according to the embodiment of the present invention. For example, magnetic sheet 4 that is included in secondary-side non-contact charging module 2 is used. FIG. 8(*a*) is a top view of the magnetic sheet of the non-contact charging module according to the embodiment of the present invention and FIG. 8(*b*) is a top view of the magnetic sheet in the case where the position of the linear concave portion of the magnetic sheet in FIG. 8(*a*) is changed. In this case, a hole portion that is configured as a concave portion or a through-hole is provided in center portion 32*b*. FIG. 8(*c*) is a cross-sectional view taken along the line E-E of FIG. 8(*a*), FIG. 8(*d*) is a cross-sectional view taken along the line F-F of FIG. 8(*a*) in the case where the center portion is configured as the concave portion, and FIG. 8(*e*) is a cross-sectional view taken along the line F-F of FIG. 8(*a*) in the case where the center portion is configured as the through-hole. In center portion 32*b*, the concave portion or the through-hole is provided.

By providing the hole portion configured as the concave portion or the through-hole in center portion 32*b*, an influence of magnet 30*a* that is included in primary-side non-contact charging module 1 can be decreased. The reason will be described below.

For example, primary-side non-contact charging module 1 including magnet 30*a* and magnetic sheet 4 of secondary-side non-contact charging module 2 performing power transmission will be described. However, the description of magnetic sheet 4 of secondary-side non-contact charging module 2 as described below is applied to secondary-side non-contact charging module 2 including magnet 30b and magnetic sheet 3 of primary-side non-contact charging module 1 performing power transmission. That is, a center portion of the magnetic sheet of the non-contact charging module that can perform aligning and power transmission in both of the case where the other non-contact charging module which is the counterpart of the power transmission includes the magnet and the case where the other non-contact charging module does not include the magnet will be described.

As described above, the non-contact power transmitting apparatus may use the magnet or may not use the magnet in aligning of primary-side non-contact charging module 1 and secondary-side non-contact charging module 2. The magnetic flux between the primary-side and the secondary-side non-contact charging modules may be disturbed when the magnet exists. For this reason, the L values of primary-side coil 11a of primary-side non-contact charging module 1 and secondary-side coil 11b of secondary-side non-contact charging module 2 greatly decrease when the magnet exists.

Primary-side coil 11a forms an LC resonance circuit with a resonance capacitor, in primary-side non-contact charging module 1. At this time, if the L values greatly change in the case where magnet 30a is used in aligning and the case where magnet 30a is not used in aligning, the resonance frequency with the resonance capacitor may greatly change. The resonance frequency is used in power transmission of primary-side non-contact charging module 1 and secondary-side non-contact charging module 2. For this reason, if the resonance frequency greatly changes according to existence or non-existence of magnet 30a, power transmission may not be correctly performed.

Therefore, in order to make the resonance frequency in the case where magnet 30a is used in aligning similar to the resonance frequency in the case where magnet 30a is not used, the L value of secondary-side coil 11b in the case where magnet 30a is used in aligning and the L value of secondary-side coil 11b in the case where magnet 30a is not used in aligning need to be set to similar values.

Next, a relation of the thickness of the center portion of magnetic sheet 4 and the L value of secondary-side coil 11b in the case where primary-side non-contact charging module 1 is included and the case where primary-side non-contact charging module 30a is not included will be described.

Figure 9:
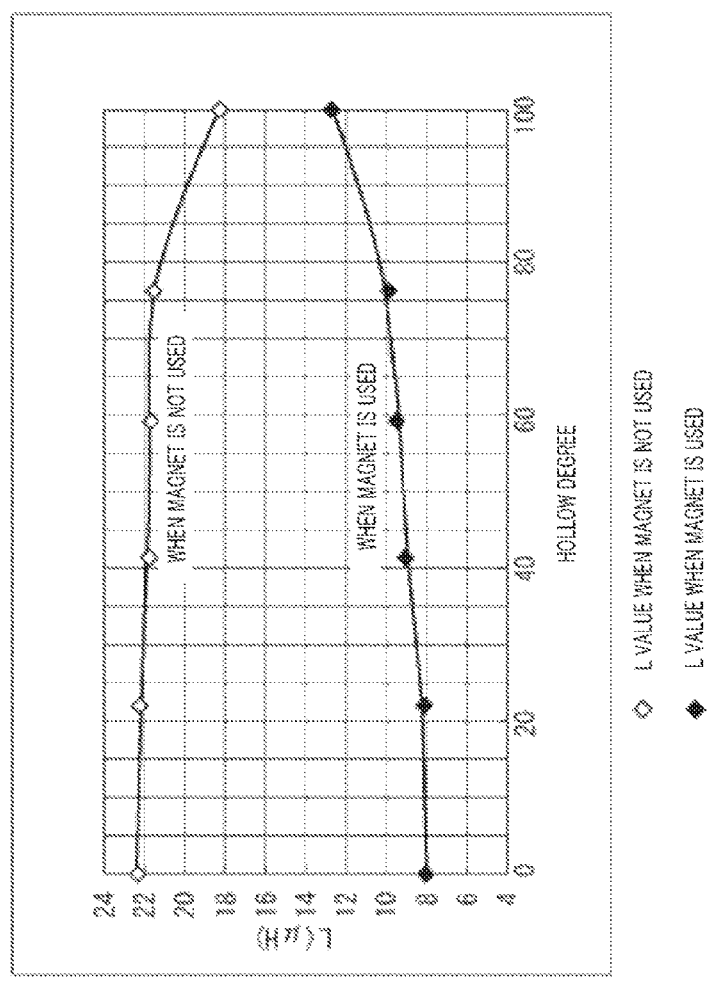
FIG. 9 is a diagram illustrating a relation of an L value of a coil of the non-contact charging module and the thickness of a center portion in the case where a magnet is used and the case where the magnet is not used in aligning in the other non-contact charging module according to the embodiment of the present invention.

FIG. 9 is a diagram illustrating a relation of an L value of a coil of the non-contact charging module and the thickness of a center portion in the case where a magnet is used and in the case where the magnet is not used in aligning in the other non-contact charging module according to the embodiment of the present invention. As the degree of a hollow, 0% illustrates a state in which center portion 32b is not configured as the concave portion and is flat, and 100% illustrates a state in which center portion 32b is configured as the through-hole.

In the case where magnet 30a is not used, as the thickness of center portion 32b of magnetic sheet 4 decreases, the magnetic field of secondary-side coil 11b decreases and the L value decreases. Meanwhile, in the case where magnet 30a is used, as the thickness of center portion 32b of magnetic sheet 4 decreases, the distance of a stack direction of magnetic sheet 4 and magnet 30a increases. For this reason, an influence of magnet 30a decreases, the magnetic field of secondary-side coil 11b increases, and the L value increases. In the case where center portion 32b is configured as the through-hole, the L values are most similar. That is, if center portion 32b is configured as the through-hole, an influence of magnet 30a that is used in aligning can be suppressed to a minimum.

Since magnet 30a and magnetic sheet 4 attract each other and perform aligning, aligning precision is improved when center portion 32b has some thickness. In particular, aligning precision can be stabilized by setting the hollow degree to 60% or less.

Therefore, if the hollow degree is set to 40 to 60%, the L values of secondary-side coil 11b in the case where magnet 30a is used in aligning and the case where magnet 30a is not used in aligning can be set to be similar to each other and an aligning effect of magnet 30a can be sufficiently obtained. That is, magnet 30a and center portion 32b of magnetic sheet 4 attract each other and the centers thereof can be aliened.

In the present embodiment, the hollow degree is set to about 50% and the effects of both sides can be obtained. In order to maintain about half of the entire thickness, the through-hole may be filled with the magnetic material up to half the entire depth, after the through-hole is formed. The hole portion (concave portion or through-hole) that is provided in center portion 32b does not need to have the shape and the size equal to those of center portion 32a. Even though the shape of center portion 32b, that is, the hollow portion of the coil is a substantially rectangular shape or a substantially circular shape, the hole portion may have various shapes without depending on the shape thereof. That is, the hole portion may have a rectangular shape or a circular shape. The hole portion is preferably formed to be smaller than center portion 32b and may secure an area of 30% or more of an area of center portion 32b.

Since magnetic sheets 3 and 4 may be formed by stacking a material having the high saturation magnetic flux density and a material having the high permeability, the center portion of the material having the high saturation magnetic flux density may be formed to be flat, the through-hole may be formed in the center portion of the material having the high permeability, and center portions 32a of magnetic sheets 3 and 4 may be formed in a concave shape. The material having the high saturation magnetic flux density means a magnetic sheet that has the saturation magnetic flux density higher than that of the material having the high permeability and has the permeability lower than that of the material having the high permeability, and may be a ferrite sheet in particular.

The diameter of the concave portion and the through-hole may be smaller than the inner diameter of secondary-side coil 11b. By setting the diameter of the concave portion or the through-hole to be substantially equal to the inner diameter of secondary-side coil 11b (smaller than the inner diameter of the coil by 0 to 2 mm), the magnetic field in an inner circumferential circle of secondary-side coil 11b can be increased.

By setting the diameter of the concave portion or the through-hole to be smaller to the inner diameter of the coil (smaller than the inner diameter of the coil by 2 to 8 mm) to become a stepped shape, the stepped outer side can be used in aligning and the inner side can be used to make the L values of primary-side coil 11a in the case where magnet 30a is used in aligning and the case where magnet 30a is not used in aligning similar to each other. The size of the concave portion or the through-hole may be larger than the size of magnet 30a. That is, the hole portion may be formed to have the diameter larger than that of magnet 30a and have the size smaller than that of the hollow portion of secondary-side coil 11b.

By setting the shape of the top surface of the concave portion or the through-hole to be equal to the shape of the hollow portion of secondary-side coil 11b, magnet 30a and center portion 32b of magnetic sheet 4 can attract with a good balance and the centers thereof can be precisely aligned.

By configuring all of the ends of the concave portion or the through-hole to have the same distance from the inner diameter of secondary-side coil 11b, magnet 30a and center portion 32b of magnetic sheet 4 can attract with a good balance and the centers thereof can be precisely aligned.

By matching the center of the shape of the top surface of the concave portion or the through-hole with the center of the hollow portion of secondary-side coil 11b, magnet 30a and center portion 32b of magnetic sheet 4 can attract with a good balance and the centers thereof can be precisely aligned. By forming the concave portion or the through-hole to be bigger than magnet 30a, an influence of magnet 30a can be suppressed with a good balance.

As described above, the configuration where the center portion is configured as the hole portion can be applied to the primary-side non-contact charging and magnetic sheet 3 and the effect is obtained even though the hole portion is included in center portion 32a of magnetic sheet 3 of primary-side non-contact charging module 1. That is, primary-side non-contact charging module 1 that can perform aligning and effective power transmission in both of the case where secondary-side non-contact charging module 2 includes magnet 30b and the case where secondary-side non-contact charging module 2 does not include magnet 30b can be configured.

Thick portions may be formed in areas where coils 11a and 11b on flat portions 31a and 31b are not disposed, in the four corners of magnetic sheets 3 and 4. That is, none are placed on magnetic sheets 3 and 4 corresponding to portions that are closer to the outside than the outer circumference of coils 11a and 11b on flat portions 31a and 31b in the four corners of magnet sheets 3 and 4. Therefore, by increasing the thickness of magnetic sheets 3 and 4 by forming the thick portions in the areas, power transmission efficiency of the non-contact power transmitting apparatus can be improved. The thickness of the thick portions is preferably large. However, the thickness of the thick portions is set to be almost equal to the thickness of the electrical lines to decrease the thickness of the apparatus.

Figure 10B:
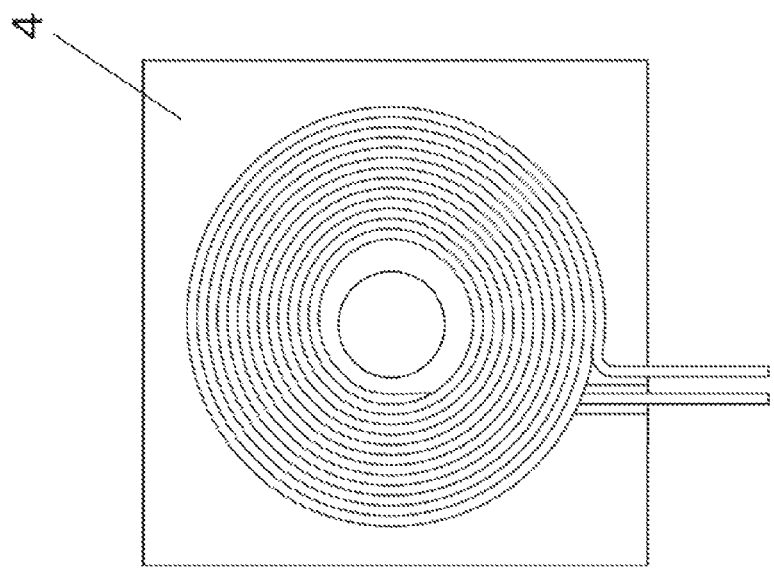
FIG. 10 is a top view of a non-contact charging module according to the present invention where a coil is wound in a rectangular shape or a circular shape.
Figure 10A:
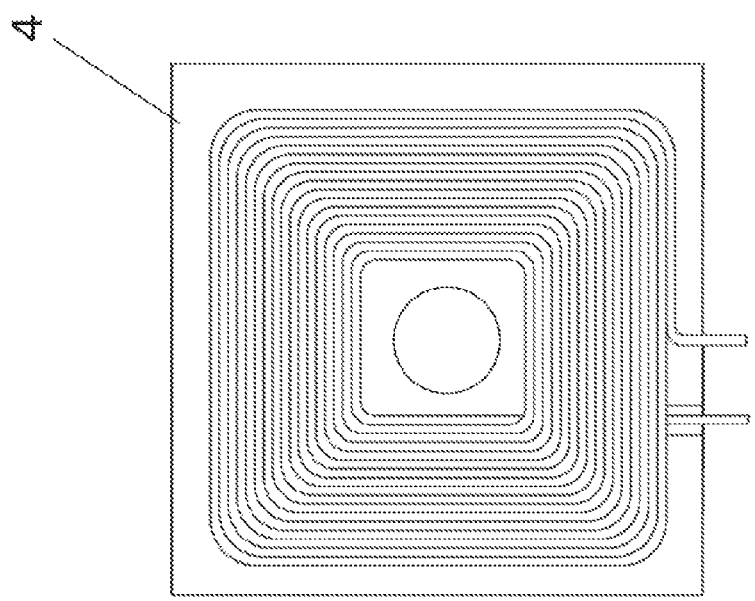

FIG. 10 is a top view of the non-contact charging module where coil 11b is wound in a rectangular shape or a circular shape. FIG. 10(a) illustrates the case where coil 11b is wound in the rectangular shape and FIG. 10(b) illustrates the case where coil 11b is wound in the circular shape. Even when coil 11b is wound in the rectangular shape or the circular shape, the concave portion or the through-hole is formed in the hollow portion of coil 11b and the above-described effect is obtained by the hole portion. In FIG. 10, the secondary-side non-contact charging module is illustrated. However, the primary-side non-contact charging module may have the same effect.

INDUSTRIAL APPLICABILITY

According to the non-contact charging module according to the present invention, the change of the L value of the coil that is provided in the non-contact charging module can be suppressed in both of the case where the magnet of the counterpart-side non-contact charging module is used in aligning of the primary-side non-contact charging module and the secondary-side non-contact charging module and the case where the magnet is not used. Therefore, the non-contact charging module can be used in both of the case where the magnet is used and the case where the magnet is not used and can be used as a reception-side charging apparatus when a portable terminal such as a mobile phone, a portable audio device, and a portable computer and a portable apparatus such as a digital camera and a video camera are charged.

REFERENCE SIGNS LIST

1 Primary-side non-contact charging module
2 Secondary-side non-contact charging module
3 Magnetic sheet (primary side)
4 Magnetic sheet (secondary side)
11a Primary-side coil
11b Secondary-side coil
22a, 23a Terminal (primary side)
22b, 23b Terminal (secondary side)
30a Magnet (primary side)
30b Magnet (secondary side)
31a Flat portion (primary side)
31b Flat portion (secondary side)
32a Center portion (primary side)
32b Center portion (secondary side)
33a Linear concave portion (primary side)
33b Linear concave portion (secondary side)
34a Slit (primary side)
34b Slit (secondary side)

The invention claimed is:

1. A reception-side non-contact charging module that receives power from a transmission-side non-contact charging module by an electromagnetic induction and that has a case where a magnet included in the transmission-side non-contact charging module is used to align with the transmission-side non-contact charging module or a case where the magnet is not used to align with the transmission-side non-contact charging module, the reception-side contact charging module comprising:
    a planar coil portion in which a conducting wire is wound; and
    a magnetic sheet that places a coil surface of the planar coil portion and faces the coil surface of the planar coil portion,
    wherein the magnetic sheet has a concavity of a predetermined depth provided within an inner winding of the planar coil portion, and
    wherein the predetermined depth of the concavity is 40 to 60% of a thickness of the magnetic sheet.

2. The reception-side non-contact charging module according to claim 1, wherein a shape of a top surface of the through-hole is the same as a shape of the inner circle winding of the planar coil portion.

3. The reception-side non-contact charging module according to claim 2, wherein all ends of the through-hole are at the same distance from the inner winding of the planar coil portion.

4. A reception-side non-contact charging apparatus, comprising the reception-side non-contact charging module according claim 1, that receives power from a transmission-side non-contact charging apparatus comprising the transmission-side non-contact charging module.

5. A transmission-side non-contact charging module that transmits power to a reception-side non-contact charging module by an electromagnetic induction, that has a case where a magnet provided in a hollow portion of a reception-side planar coil portion included in the reception-side non-contact charging module is used when alignment with the reception-side non-contact charging module is performed or a case where the magnet is not used when the alignment is performed, and that itself does not have the magnet for the alignment, the transmission-side non-contact charging module comprising:
    a transmission-side planar coil portion in which a conducting wire is wound; and
    a magnetic sheet on which a coil surface of the planar coil portion is placed and that faces the coil surface of the transmission-side planar coil portion and that attracts, in the case where the magnet is used when the alignment with the reception-side non-contact charging module is performed, the magnet of the reception-side non-contact charging module, wherein:

the magnetic sheet has a through-hole provided within an inner winding of the transmission-side planar coil portion; and an area of the hollow portion is equal to or more than 30% of an area of a center portion of the magnetic sheet.

6. A transmission-side non-contact charging module that transmits power to a reception-side non-contact charging module by an electromagnetic induction, that has a case where a magnet provided in a hollow portion of a reception-side planar coil portion included in the reception-side non-contact charging module is used when alignment with the reception-side non-contact charging module is performed or a case where the magnet is not used when the alignment is performed, and that itself does not have the magnet for the alignment, the transmission-side non-contact charging module comprising:

a transmission-side planar coil portion in which a conducting wire is wound; and a magnetic sheet on which a coil surface of the planar coil portion is placed and that faces the coil surface of the transmission-side planar coil portion and that attracts, in the case where the magnet is used when the alignment with the reception-side non-contact charging module is performed, the magnet of the reception-side non-contact charging module, wherein:

the magnetic sheet has a concavity of a predetermined depth provided within an inner winding of the transmission-side planar coil portion, an area of the hollow portion is equal to or more than 30% of an area of a center portion of the magnetic sheet, and the predetermined depth of the concavity is 40 to 60% of a thickness of the magnetic sheet.

7. The transmission-side non-contact charging module according claim 5, wherein a shape of a top surface of the through-hole is the same as a shape of the inner winding of the transmission-side planar coil portion.

8. The transmission-side non-contact charging module according to claim 7, wherein all ends of the through-hole are at the same distance from the inner winding of the transmission-side planar coil portion.

9. The transmission-side non-contact charging module according to claim 5, wherein the through-hole is formed larger than the magnet.

10. The transmission-side non-contact charging module according to claim 5, wherein a center of the through-hole coincides with a center of the center portion of the transmission-side planar coil portion.

11. A transmission-side non-contact charging apparatus comprising the transmission-side non-contact charging module according to claim 5.

12. A reception-side non-contact charging module that receives power from a transmission-side non-contact charging module by an electromagnetic induction and that has a case where a magnet provided in a hollow portion of a transmission-side planar coil portion included in the transmission-side non-contact charging module is used when alignment with the transmission-side non-contact charging module is performed or a case where the magnet is not used when the alignment is performed, the reception-side non-contact charging module comprising:

a reception-side planar coil portion in which a conducting wire is wound in a substantially rectangular shape; and a magnetic sheet on which a coil surface of the planar coil portion is placed and that faces the coil surface of the reception-side planar coil portion, wherein the magnetic sheet has a through-hole provided within an inner winding of the reception-side planar coil portion, the hollow portion of the transmission-side planar coil portion being in a substantially rectangular shape.

13. A reception-side non-contact charging module that receives power from a transmission-side non-contact charging module by an electromagnetic induction and that has a case where a magnet provided in a hollow portion of a transmission-side planar coil portion included in the transmission-side non-contact charging module is used when alignment with the transmission-side non-contact charging module is performed or a case where the magnet is not used when the alignment is performed, the reception-side non-contact charging module comprising:

a reception-side planar coil portion in which a conducting wire is wound in a substantially rectangular shape; and a magnetic sheet on which a coil surface of the planar coil portion is placed and that faces the coil surface of the reception-side planar coil portion, wherein the magnetic sheet has a concavity of a predetermined depth provided within an inner winding of the reception-side planar coil portion, the hollow portion of the transmission-side planar coil portion being in a substantially rectangular shape, and the predetermined depth of the concavity is 40 to 60% of a thickness of the magnetic sheet.

14. The reception-side non-contact charging module according to claim 12, wherein a shape of a top surface of the through-hole is the same as a shape of the inner winding of the reception-side planar coil portion.

15. The reception-side non-contact charging module according to claim 14, wherein all ends of the through-hole are at the same distance from ends of the inner winding of the reception-side planar coil portion.

16. The reception-side non-contact charging module according to claim 12, wherein the through-hole is formed larger than the magnet.

17. The reception-side non-contact charging module according to claim 12, wherein a center of the through-hole coincides with a center of a center portion of the reception-side planar coil portion.

18. A transmission-side non-contact charging module that transmits power to a reception-side non-contact charging module by an electromagnetic induction and that has a case where a magnet provided in a hollow portion of a reception-side planar coil portion included in the reception-side non-contact charging module is used when alignment with the reception-side non-contact charging module is performed or a case where the magnet is not used when alignment with the reception-side non-contact charging module is performed, the transmission-side non-contact charging module comprising:

a transmission-side planar coil portion in which a conducting wire is wound in a substantially rectangular shape; and a magnetic sheet on which a coil surface of the planar coil portion is placed and that faces the coil surface of the transmission-side planar coil portion, wherein the magnetic sheet has a through-hole provided within an inner winding of the transmission-side planar coil portion, the hollow portion of the reception-side planar coil portion being in a substantially rectangular shape.

19. A portable terminal apparatus comprising the reception-side non-contact charging module according to claim 12.

20. A non-contact charging apparatus comprising the transmission-side non-contact charging module according to claim 18.

21. The reception-side non-contact charging module according to claim 12, wherein the planar coil portion is formed by spirally winding the conducting wire.

22. The reception-side non-contact charging module according to claim 12, further comprising an alignment magnet, wherein the alignment magnet couples to a magnet included in the transmission-side non-contact charging module and the alignment magnet is used to align the reception-side non-contact charging module with the transmission-side non-contact charging module.

23. The reception-side non-contact charging module according to claim 12, further comprising an alignment module, wherein the alignment module does not use a magnet to align the reception-side non-contact charging module with the transmission-side non-contact charging module.

24. The reception-side non-contact charging module according to claim 12, wherein the planar coil portion further comprises a coil surface and the magnetic sheet is coupled opposite to the coil surface.

25. The reception-side non-contact charging module according to claim 24, wherein the magnetic sheet touches the coil surface.

26. The reception-side non-contact charging module according to claim 21, wherein the through-hole is formed at an inner position corresponding to the inner winding of the planar coil portion.

27. The reception-side non-contact charging module according to claim 1, wherein the concavity is partially bored into the magnetic sheet.

28. The reception-side non-contact charging module according to claim 12, wherein the through-hole is centered opposite to the inner winding of the planar coil portion.

29. The reception-side non-contact charging module according to claim 26, wherein the through-hole is concentric to the inner winding of the planar coil portion.

30. The transmission-side non-contact charging module according to claim 5, wherein the transmission-side planar coil portion is formed by spirally winding the conducting wire.

31. The transmission-side non-contact charging module according to claim 30, wherein the through-hole is formed at an inner position corresponding to the inner winding of the planar coil portion.

32. The transmission-side non-contact charging module according to claim 6, wherein the concavity is partially bored into the magnetic sheet.

33. The transmission-side non-contact charging module according to claim 5, wherein the through-hole is centered opposite to the inner winding of the planar coil portion.

34. The transmission-side non-contact charging module according to claim 31, wherein the through-hole is concentric to the inner winding of the planar coil portion.

35. The transmission-side non-contact charging module according to claim 5, wherein the magnet sheet is operatively coupled to an alignment magnet of the reception-side non-contact charging module.

36. The transmission-side non-contact charging module according to claim 35, wherein the through-hole has an area greater that an area of the alignment magnet.

\* \* \* \* \*